United States Patent [19]

Moyer

[11] Patent Number: 5,166,779
[45] Date of Patent: Nov. 24, 1992

[54] SUBCARRIER TO HORIZONTAL PHASE MEASUREMENT AND DISPLAY FOR MULTIPLE VIDEO SIGNALS

[75] Inventor: Todd K. Moyer, Boyertown, Pa.

[73] Assignee: Videotek, Inc., Pottstown, Pa.

[21] Appl. No.: 761,658

[22] Filed: Sep. 18, 1991

[51] Int. Cl.⁵ .......................................... H04N 17/02
[52] U.S. Cl. ...................................... 358/10; 358/19
[58] Field of Search ..................... 358/10, 139, 19, 20

[56] References Cited

U.S. PATENT DOCUMENTS

| | | | |
|---|---|---|---|
| 4,470,064 | 9/1984 | Michener | 358/10 |
| 4,587,551 | 5/1986 | Penney | 358/10 |
| 4,603,346 | 7/1986 | Melling, Jr. | 358/10 |
| 4,680,620 | 7/1987 | Baker et al. | 358/10 |
| 4,694,324 | 9/1987 | Matney | 358/10 |
| 4,758,890 | 7/1988 | Boyce | 358/148 |
| 4,788,585 | 11/1988 | Suzuki | 355/10 |
| 4,792,845 | 12/1988 | Judge | 358/10 |
| 4,860,089 | 8/1989 | Smith | 358/10 |
| 4,881,121 | 11/1989 | Judge | 358/10 |
| 4,941,035 | 7/1990 | Judge | 358/19 X |
| 5,057,910 | 10/1991 | Judge | 358/10 |

Primary Examiner—James J. Groody
Assistant Examiner—Mark R. Powell
Attorney, Agent, or Firm—Eckert, Seamans, Cherin & Mellott

[57] ABSTRACT

A subcarrier to horizontal sync (SC/H) phase difference measurement and display device for multiple sources of composite video signals includes a sample clock generator providing a sampling clock at a fixed frequency, a digitizer providing numeric samples representing an amplitude of each of the sources at least during the interval between the horizontal sync pulse and the color burst of at least one horizontal line in each of the sources. The samples are stored in memory and a processor compares successive samples, while counting samples or monitoring elapsed time, to find the midpoint of the leading edge of the sync pulse and a zero crossing of the burst. The lapse of time (or number of samples) defines the SC/H phase difference and is displayed for all of the sources for direct graphic comparison. The digitizer, memory, processor and display are coupled over a data bus. A line counter responsive to horizontal syncs in each source, reset upon vertical retrace, triggers capture of the data at a selected horizontal line, which can be different for the respective sources, and the line numbers are displayed together with the graphic comparison.

20 Claims, 2 Drawing Sheets

SUBCARRIER TO HORIZONTAL PHASE MEASUREMENT AND DISPLAY FOR MULTIPLE VIDEO SIGNALS

BACKGROUND OF THE INVENTION

1. Field of the Invention the Invention

This invention relates to methods and apparatus for measuring and displaying the phase relationship between the subcarrier and the horizontal sync (the SC/H phase) of a video signal, and in particular to a high accuracy digital method and apparatus for measuring and displaying the SC/H phase of a plurality of video signals simultaneously.

2. Prior Art

Color video display apparatus have discrete phosphor areas disposed in a repetitive pattern of colors, the individual dots or segments for a particular color being activated by the electron beam as it scans over the screen in horizontal lines. The video color information encoded in the video signal is presented in timed coincidence with the scanning of the beam over the repetitive color patterns, and accordingly the phase relationship between the encoded color information and the sync pulses which trigger the scanning circuits of the display apparatus is an important consideration. Color information is synchronized to a subcarrier frequency defined by the color burst pulse which occurs shortly after the horizontal sync pulse for each horizontal line. Test equipment is available for measuring and displaying the phase relationship between the subcarrier and the horizontal sync pulse, commonly known as the SC/H phase, for use by video production personnel, broadcasters, etc.

Known devices for SC/H phase measurement and display typically rely on variable analog devices for providing phase delays, ramp signals and the like. As a result, the only practical way to measure the SC/H phase of a plurality of video signals simultaneously has been to substantially duplicate the measurement and display apparatus for every signal which is to be measured. Multiple circuits, however, do not act identically due to variations in components and the like. The multiple circuits can be expected to provide at least slightly different results even for one signal. Moreover, the analog devices are subject to problems of accuracy and drift.

According to one known method of SC/H phase measurement, one subcarrier signal is phase-locked to the horizontal sync and another subcarrier signal is phase-locked to the color burst. The SC/H phase difference is defined by the phase difference of these two subcarriers, and is displayed, for example, by using the signals as the X and Y inputs to an oscilloscope to provide a vectorscope type phase display. The phase difference is represented by the angular displacement of the displayed dot from a reference dot or line representing a zero phase angle. Prior art devices along these lines are disclosed in U. S. Pat. Nos. 4,587,551—Penney; 4,788,585—Suzuki; and 4,694,324—Matney. Of course it is also possible to display the extent of phase difference between two signals as a numeric readout or as a bargraph.

According to another known method, the time lapse between the midpoint of the leading edge of the horizontal sync pulse and a zero crossing of the color burst is measured. Alternatively the time lapse can be measured between the leading edge of the sync and the next zero crossing of a reference subcarrier regenerated from the color burst. This normally requires an analog circuit or a combination analog/digital circuit, for finding the midpoint of the leading edge and determining the time lapse. The time lapse can be translated into degrees of phase difference by relating the time to the period of the subcarrier, e.g., at the nominal 3.579545 MHz for an NTSC subcarrier. The results can be displayed as a numeric readout, bargraph, etc.

U. S. Pat. No. 4,758,890—Boyce discloses a circuit for comparing the subcarrier frequency to a horizontal sync pulse. The sync pulse is delayed by a variable delay circuit controlled in a feedback loop, and operable to delay the sync pulse to ensure that the leading edges of the sync pulse corresponds to a the zero crossing of the subcarrier.

U. S. Pat. Nos. 4,603,346—Melling, Jr.; 4,680,620—Baker et al; and 4,792,845—Judge are additional examples of phase comparators and displays. U. S. Pat. No. 4,470,064—Michener discloses a circuit operable to capture and digitize the value of a burst-locked subcarrier and a quadrature subcarrier as a means of acquiring data necessary to calculate the SC/H phase. Additionally, the Tektronix model VM-700 Video Measurement Set calculates SC/H phase from a digitized signal. The VM-700 and the Michener device employ digital techniques, and Michener is switchable between two video inputs. Nevertheless, the devices can only deal with one signal at a time.

If a transmitted signal at one SC/H phase is suddenly substituted with a signal at a different SC/H phase, the result is a flash of poor color purity and/or a variation in intensity. It would be desirable to provide an accurate and drift free measurement apparatus for SC/H phase measurement that can measure and display multiple video sources simultaneously, i.e., without the need for the operator to switch between video sources for one-at-a-time measurements. Such a system would be particularly helpful as a production and broadcast tool in conjunction with video switchers coupled to multiple video sources such as a plurality of prerecorded sources and the like, assisting in the merging of multiple signal sources into a program.

The present invention provides a digital circuit operable to accomplish multiple source SC/H phase measurements, and provides a means for simultaneous display of the results in a preferably graphic format. In this manner the phase conditions of a plurality of sources can be monitored.

SUMMARY OF THE INVENTION

It is an object of the invention to provide accurate and drift free measurement of the subcarrier to horizontal sync phase relationship for each of a plurality of video signals, and to display the results simultaneously, for graphic and numeric comparison.

It is a further object to minimize the complexity and expense of SC/H phase measurement equipment monitoring multiple video sources.

It is also an object of the invention to employ a digital processor for direct measurement of SC/H phase difference for multiple sources, the results being displayed in direct comparison format.

These and other objects are accomplished by a subcarrier to horizontal sync (SC/H) phase difference measurement and display device for multiple sources of composite video signals including a sample clock generator providing a sampling clock at a fixed frequency, a digitizer providing numeric samples representing an amplitude of each of the sources at least during the interval between the horizontal sync pulse and the color burst of at least one horizontal line in each of the sources. The samples are stored in memory and a processor compares successive samples, while counting samples or monitoring elapsed time, to find the midpoint of the leading edge of the sync pulse and a zero crossing of the burst. The lapse of time (o number of samples) defines the SC/H phase difference and is converted to a phase angle with reference to the subcarrier frequency, and displayed for all of the sources for direct graphic comparison. The digitizer, memory, processor and display are coupled over a data bus. Preferably a high frequency sample clock captures the data in a line store memory for numerical analysis by a processor operating asynchronously with the sample clock. A line counter responsive to horizontal syncs in each source, reset upon vertical retrace, triggers capture of a plurality of data samples at a selected horizontal line. Preferably the same line is captured in each of the sources. The line number is displayed together with the graphic comparison. A display memory and display controller convert the data for display on a CRT. The SC/H measurement and display functions are preferably one of a number of display options incorporated in a test apparatus according to the invention.

BRIEF DESCRIPTION OF THE DRAWINGS

There are shown in the drawings exemplary embodiments of the invention as presently preferred. It should be understood that the invention is not limited to the precise arrangements and instrumentalities shown and discussed, and is capable of variation in accordance with the scope of the appended claims and their reasonable equivalents. In the drawings.

DETAILED DESCRIPTION OF THE PREFERRED EMBODIMENTS

Figure 1:
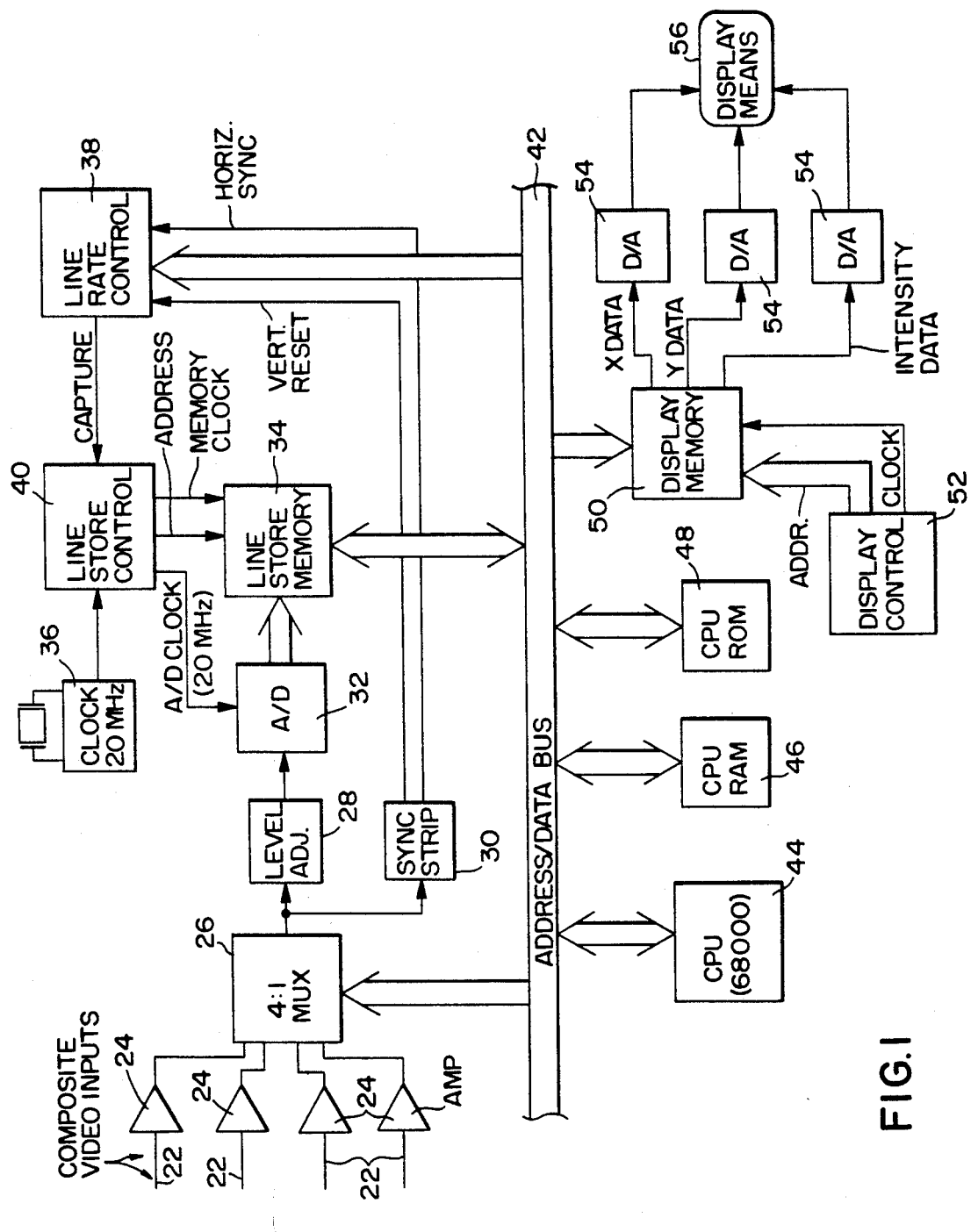
FIG. 1 is a schematic block diagram showing the elements of the invention.
Figure 2:
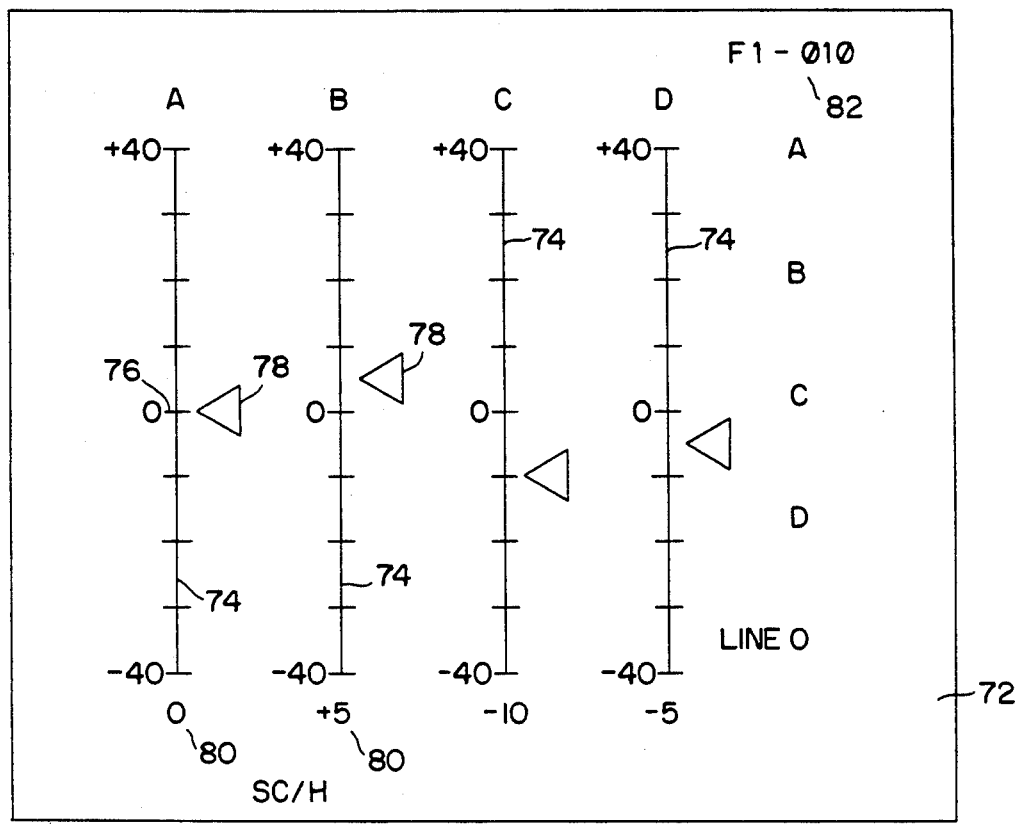
FIG. 2 is an elevation view showing the resulting display of SC/H phase.

As shown in the block diagram of FIG. 1, the apparatus of the invention is coupled to a plurality of video sources 22, the SC/H phase differences of which are to be measured, and displayed graphically via display means 56 to produce an image as shown in FIG. 2. The SC/H phase difference is defined as the time lapse between the midpoint 64 of the leading edge 58 of the horizontal sync pulse, shown in FIG. 3, and the rising zero crossing 68 of the burst pulse 66, measured in degrees of phase at the burst or video subcarrier frequency.

Each of the composite video inputs 22 is coupled to an input buffer amplifier 24, and the outputs of the buffer amplifiers are coupled to a four-to-one multiplexer 26, operable under control of CPU 44 to select one of the four signals for coupling onto the output of multiplexer 26. The CPU cycles repetitively through the inputs, and the data displayed for each channel represents the last time its SC/H phase was measured.

The selected video signal is adjusted a to DC offset and scaled for amplitude by level adjust circuit 28, in order to employ the full span of the analog to digital converter 32 which will sample the video signal. Additionally, sync stripper 30 extracts the horizontal sync pulses, and routes them to line rate controller 38. Line rate controller 38 counts the horizontal sync pulses, thus counting the lines of video, and resets the count upon the occurrence of a vertical sync. The line rate controller triggers the line storage controller 40 when the line count equals a predetermined number, i.e., the video line at which the SC/H phase is to be measured. Typically, for NTSC video signals, the SC/H phase difference is measured for line number ten of field one of the video signal. It is also possible to measure the SC/H phase difference at a different line, using an input means (not shown) coupled to the line rate controller 38. Normally it is desirable to measure the SC/H phase for all the sources 22 at the same line in their respective fields. When the line count equals the predetermined number, the "capture" signal coupled to the line storage controller 40 is activated, and a line of video is sampled and stored.

Analog to digital converter 32 is coupled to a sampling rate clock 36 through line storage controller 40. The sampling rate is substantially higher than the video subcarrier frequency (about 3.58 MHz), for example 20 MHz, thereby providing a sample every 50 nS during the video line. Line storage memory 34 is coupled to the output of the A/D converter 32, and loads sample data under control of a memory clock signal from the line storage controller 40, and at an address incremented by the line storage controller, such that the samples are stored successively.

Whereas the SC/H phase measurement according to the invention is preferably one of the functions of a video test apparatus which accomplishes additional functions such as display of a selected line of video, the entire video line is preferably sampled. For the purpose of SC/H phase alone, however, it is only necessary to obtain a sufficient number of samples to define the leading edge of the horizontal sync pulse and a zero crossing of the burst at the subcarrier frequency.

The CPU or processor 44 executes a program stored in CPU ROM 48, using memory in CPU RAM 46, both coupled to the CPU via address/data bus 42, which is also coupled to the line storage memory 34. The CPU 44 is programmed to effect the mathematical operations needed to convert the sample data into an SC/H phase difference. The CPU operates independently and asynchronously of sampling via line storage controller 40, and in the preferred embodiment is not coupled for direct access to line storage memory 34. Accordingly, one function of the line storage memory is to transfer the sample data at least for the SC/H phase measurement from the line storage memory to the RAM 46 coupled to the CPU via the address/data bus 42. This can be accomplished on a regular basis or at the conclusion of the recording of the video line.

Figure 3:
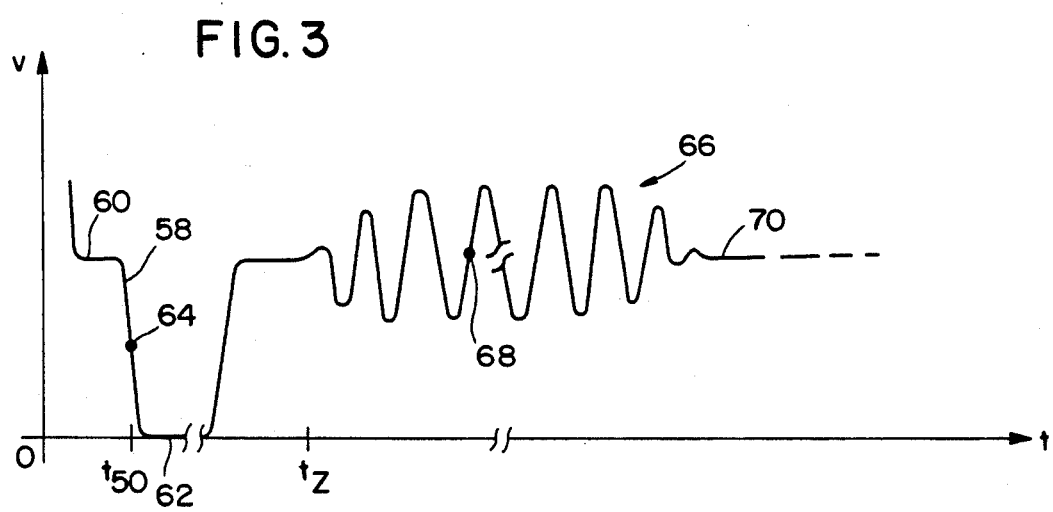
FIG. 3 is a timing diagram showing the horizontal sync and color burst portion of a video signal.

The CPU examines the successive samples to determine the 50% point of the leading edge of the horizontal sync, and a zero crossing of the subcarrier burst. A search for the leading edge of the horizontal sync pulse is performed by first calculating the derivative of the signal (i.e., the difference from sample to sample) in the area of samples where the leading edge of sync is expected to occur, and determining the sample for which the derivative is most negative. That sample can be referred to as sample P. Whereas the sync pulse is nominally sinusoidal in shape, the derivative is at a negative maximum at the midpoint, normally at a time in the sampling interval immediately before or after the instant sample P was captured, but also possibly coincident with the sample. Starting from sample P, assumed to be the closest sample to the 50% point, several samples before and several samples after are examined. The earlier samples define the level of the "front porch" area 60 of the sync pulse as shown in FIG. 3. The later samples define the sync tip or floor level 62. The precise 50% level of the leading edge is then calculated as the average of these two levels.

The calculated 50% level of the leading edge is compared to the levels of the samples adjacent sample P, at which the derivative was most negative, in order to determine whether the precise 50% level occurred before or after the instant at which sample P was collected. The exact time of the 50% level ("$t_{50}$") is then interpolated to a time in the interval between sample P and the previous or subsequent sample, i.e., to a precise point in time between samples. This interpolation is based on the position of the calculated 50% level in the range defined by the difference between the level of sample P and the next or previous sample. The interpolation is performed by fitting a sinusoidal curve (the nominal shape of the sync edge) to P and the next or previous sample. Then the time of the 50% point is calculated by the processor. Of course if the calculated 50% level is equal to the level of sample P, the 50% point is deemed to have occurred at the time of sample P.

A search for the rising zero crossing of the color burst is performed by examining the derivative of the signal (i.e., sample to sample difference) in the area where the color burst is expected to have occurred. The sample (referred to as sample M) having the most positive derivative is assumed to be the sample closest to the rising zero crossing of the burst, again due to the sinusoidal nature of the signal. A digital low-pass function is then applied to several samples neighboring sample M to filter out the high frequency burst portion of the signal and to define the "back porch" level 70 as shown in FIG. 3, namely the low frequency component of the signal during the burst. In the same manner as with the 50% point of the horizontal sync, the back porch level is compared to the samples immediately adjacent sample M to determine whether the zero crossing (actually the back porch level crossing) occurred before or after the instant of sample M. The proportionate point of the zero crossing level in the range between the level of sample M and this next or previous sample are then related to the time the samples were captured, thus interpolating the precise time ("$t_z$") of the zero crossing.

The difference between times $t_{50}$ and $t_z$ is then calculated to yield a difference in units of time. However, the SC/H phase difference is needed in degrees of phase of the subcarrier frequency. The time difference ($t_z - t_{50}$) is converted to a number of cycles at the frequency of the subcarrier (e.g., 3.579545 MHz for NTSC, or a period of about 280 nS), resulting in an integer plus a fractional number of cycles. The result is rounded to an integer and subtracted from the integer-plus-fraction number, providing a fraction between $-0.5$ and $+0.5$. This fraction is multiplied times 360, to give the phase difference in number of degrees, ranging between $-180$ degrees and $+180$ degrees.

Preferably, the results of the computation are stored by the processor in a cycling FIFO memory, comprising one FIFO for each of the plural video signals at the input. The entries in the FIFO for each source are averaged with the other entries in the FIFO for that source, thus reducing the effects of noise and random errors. The results are displayed both graphically and numerically on the display.

According to the preferred embodiment the display device has a pixel-type display memory 50 having a field of pixels which are read out repetitively under control of a display controller 52. The variable portions of the pixel display field, namely the moving markers 78, the numeric displays 80 and the line number 82, are generated from the results of calculations by the CPU, transmitted to the display memory 50 over the address-/data bus 42. The invariable portions of the display, including the graduation lines 74 and the descriptive labels, need only be loaded once by the CPU into the display memory 50, preferably according to a routine stored in the CPU ROM and executed upon initialization of the SC/H mode of operation of the device. The display memory can be used simply to provide light-/dark image data, each bit in the memory representing a pixel which will be one of two intensities. Alternatively, a more complex, e.g., color display can be provided, for example with the marker elements 78 shown in a distinct color or intensity.

In the preferred embodiment the pixel data in the display memory is read out repetitively as intensity data, and at the same time the X and Y deflection inputs to the display means are cycled through the corresponding X and Y positions. For example, the display means can be a CRT with deflection drive circuits and a kinescope driver, the outputs of which are modulated by the analog levels produced by D/A converters 54 coupled to the data outputs of the display memory 50, which is addressed and clocked by display controller 52 for reading data in or out.

The invention provides a highly accurate means for measuring the SC/H phase difference of a plurality of source signals simultaneously, permitting a direct graphic and numeric comparison of the SC/H phase for all the sources. In this manner the operator can readily set up a switcher or the like with video sources having SC/H phase differences which are close together, such that switching from one source to another has a minimal effect on color purity and the like as perceived by a viewer.

A number of variations on the invention are possible. The particular nature of the graphic display can of course be varied in its particulars of data presentation, color, etc. The span of the scales 74 can be made variable under user control or automatically by the CPU in order to set the graduation lines and upper and lower limits wide enough to accommodate the greatest SC/H phase difference while using as much as possible of the available scale area. These and other variations are believed to be within the scope of the invention defined herein.

The invention has been discussed in connection with preferred exemplary embodiments, and such variations on the preferred embodiments will now become apparent to persons skilled in the art. Whereas the invention is intended to encompass the disclosed embodiments and a range of variations in accordance herewith, reference should be made to the appended claims and their reasonable equivalents in order to assess the scope of the invention in which exclusive rights are claimed.

I claim:

1. An apparatus for measuring subcarrier to horizontal sync (SC/H) phase difference for multiple sources of composite video signals, comprising:

a sample clock generator providing a sampling clock at a fixed frequency which is substantially higher than that of the subcarrier;

a digitizer coupleable to said multiple sources and to the sampling clock, the digitizer providing numeric samples representing an amplitude of each of the sources at least during an interval between a horizontal sync pulse and a beginning of a color burst of at least one horizontal line in each of said multiple sources;

a digital memory coupled to the digitizer, and operable to store the numeric samples;

a processor coupled to the digital memory, the processor being operable to compare successive said numeric samples and to thereby identify a midpoint of a leading edge of a horizontal sync pulse and a zero crossing of a burst signal among the successive samples, and to determine a time lapse therebetween, the processor determining the SC/H phase difference from the time lapse;

a display means coupled to the processor, the display means being operable to display the SC/H phase difference for all of the sources for comparison.

2. The video apparatus according to claim 1, wherein the time lapse is determined by a number of sampling cycles between the midpoint of the leading edge and the zero crossing.

3. The video apparatus according to claim 1, wherein the digital memory includes a line store memory triggered at a horizontal rate of the video sources to load the samples at the sample rate, and a CPU memory.

4. The video apparatus according to claim 3, further comprising means for transferring from the line store memory to the CPU memory at least samples taken during the interval between the horizontal sync and the color burst.

5. The video apparatus according to claim 4, wherein the line store memory is operable to store samples during entire horizontal lines of the video sources.

6. The video apparatus according to claim 4, further comprising a line rate controller operable to count horizontal syncs in the sources and to trigger sampling at a predetermined line.

7. The video apparatus according to claim 6, wherein the digital memory, processor and display are coupled over a data bus, and further comprising a display controller coupled to the data bus and operable independently to control said display means.

8. The video apparatus according to claim 4, further comprising a display memory, and a display controller, the processor being operable to load display image data into the display memory, and wherein the display controller operates independently of the processor to display the image data.

9. The video apparatus according to claim 1, wherein the display is operable to produce a side-by-side graphic comparison of the SC/H phase difference for the sources.

10. The video apparatus according to claim 9, further comprising means operable to count horizontal syncs in the sources, said means being reset upon vertical retrace, and wherein the numeric samples are selected as a function of a count of the horizontal syncs.

11. The video apparatus according to claim 10, wherein the predetermined selected horizontal line is determined for at least one of the sources independently of the other sources.

12. The video apparatus according to claim 10, further comprising input means for selecting a number of the predetermined selected horizontal line.

13. The video apparatus according to claim 10, wherein the number of the predetermined selected horizontal line is shown on the display means with said graphic comparison.

14. A method for measuring and displaying subcarrier to horizontal sync (SC/H) phase difference of multiple video signal sources, comprising the steps of:

sampling and recording a plurality of samples of each of the video signal sources, proceeding through each of the sources in turn, at least in an area of the signals between the horizontal sync and a zero crossing of a color burst;

for each of the sources in turn, examining the samples to identify a 50% level of a leading edge of the horizontal sync and the zero crossing of the color burst;

determining a time lapse between occurrence of the 50% level and the zero crossing for each of the sources in turn;

converting the time lapse to a number of periods at a frequency of the color burst for each of the sources in turn; and, displaying graphically a fractional part of the number of periods for all the sources as a side-by-side graph on a display means, for displaying the SC/H phase of all the sources simultaneously.

15. The method according to claim 14, wherein at least one of the 50% level and the zero crossing are interpolated to a particular time between samples by calculating a precise level for said at least one of the 50% level and the zero crossing, and fitting the precise level to a nominal curve of a corresponding at least one of said horizontal sync and said color burst.

16. The method according to claim 14, further comprising maintaining a running average of a plurality of successive SC/H values for each of the sources, and wherein the running average is displayed as the SC/H phase for each respective source.

17. The method according to claim 14, further comprising selecting a particular horizontal line number for each of the sources and wherein the sampling and recording for each source is conducted as to the particular horizontal line.

18. The method according to claim 17, further comprising displaying the line number on the display means.

19. The method according to claim 14, wherein said sampling and recording are conducted asynchronously with said examining, determining, converting and displaying steps.

20. The method according to claim 19, wherein said sampling and recording are conducted at a substantially higher frequency than that of the color burst, and further comprising transferring sample data from a memory operable to store the sample data at the substantially higher frequency to a memory accessible to a digital processor for conducting the examining, determining and converting steps at a frequency asynchronous with sampling.